(12) United States Patent
Llado Abella

(10) Patent No.: US 6,201,209 B1
(45) Date of Patent: Mar. 13, 2001

(54) LASER SYSTEM FOR MARKING OR PERFORATING

(76) Inventor: Jordi Llado Abella, Girona, 46-48, 08240 Manresa (Barcelona) (ES)

( * ) Notice: Subject to any disclaimer, the term of this patent is extended or adjusted under 35 U.S.C. 154(b) by 0 days.

(21) Appl. No.: 09/101,594
(22) PCT Filed: Nov. 12, 1997
(86) PCT No.: PCT/ES97/00272
  § 371 Date: Sep. 22, 1998
  § 102(e) Date: Sep. 22, 1998
(87) PCT Pub. No.: WO98/21003
  PCT Pub. Date: May 22, 1998

(30) Foreign Application Priority Data

Nov. 12, 1996 (ES) .................................................... 9602388

(51) Int. Cl.[7] .................................................. B23K 26/00
(52) U.S. Cl. .................................... 219/121.6; 219/121.7; 219/121.73; 219/121.75
(58) Field of Search ..................... 219/121.73, 121.75, 219/121.68, 121.7, 121.6

(56) References Cited

U.S. PATENT DOCUMENTS

| 4,459,458 | * | 7/1984 | Vetsch et al. ...................... 219/121.6 |
| 5,332,881 | | 7/1994 | Topkaya et al. ................ 219/121.75 |
| 5,418,088 | * | 5/1995 | Alexandres . |
| 5,837,962 | * | 11/1998 | Overbeck ........................ 219/121.75 |

FOREIGN PATENT DOCUMENTS

| 1567698 | 5/1980 | (GB) . |
| 2202647 | 9/1988 | (GB) . |
| 9325387 | 12/1993 | (WO) . |

* cited by examiner

Primary Examiner—Geoffrey S. Evans
(74) Attorney, Agent, or Firm—Darby & Darby

(57) ABSTRACT

A laser system for marking or perforating, including a laser tube and a head having an adjustable optical system with at least one focusing lens. The telescopic tube, a system of lenses for the light beam correction, and a deflexion system are integrally provided with the laser tube. In order to easily optimize the focal distance, a focusing lens is situated in a mobile tube of the telescopic tube which includes a mobile tube (17b) and a fixed tube (17a).

27 Claims, 12 Drawing Sheets

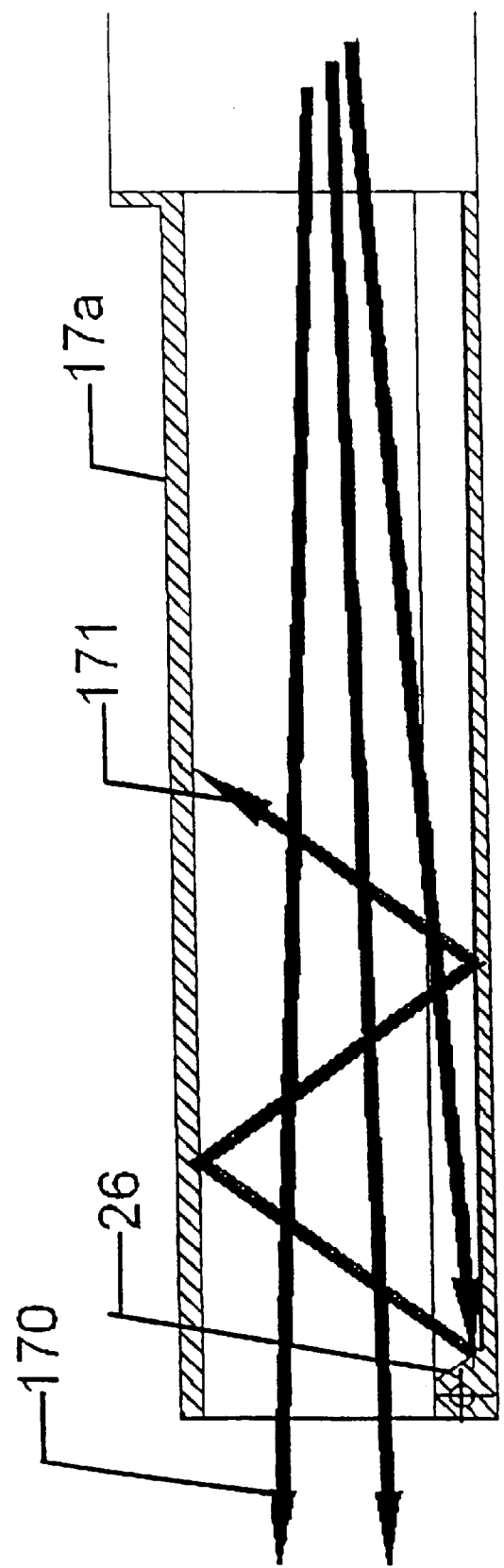

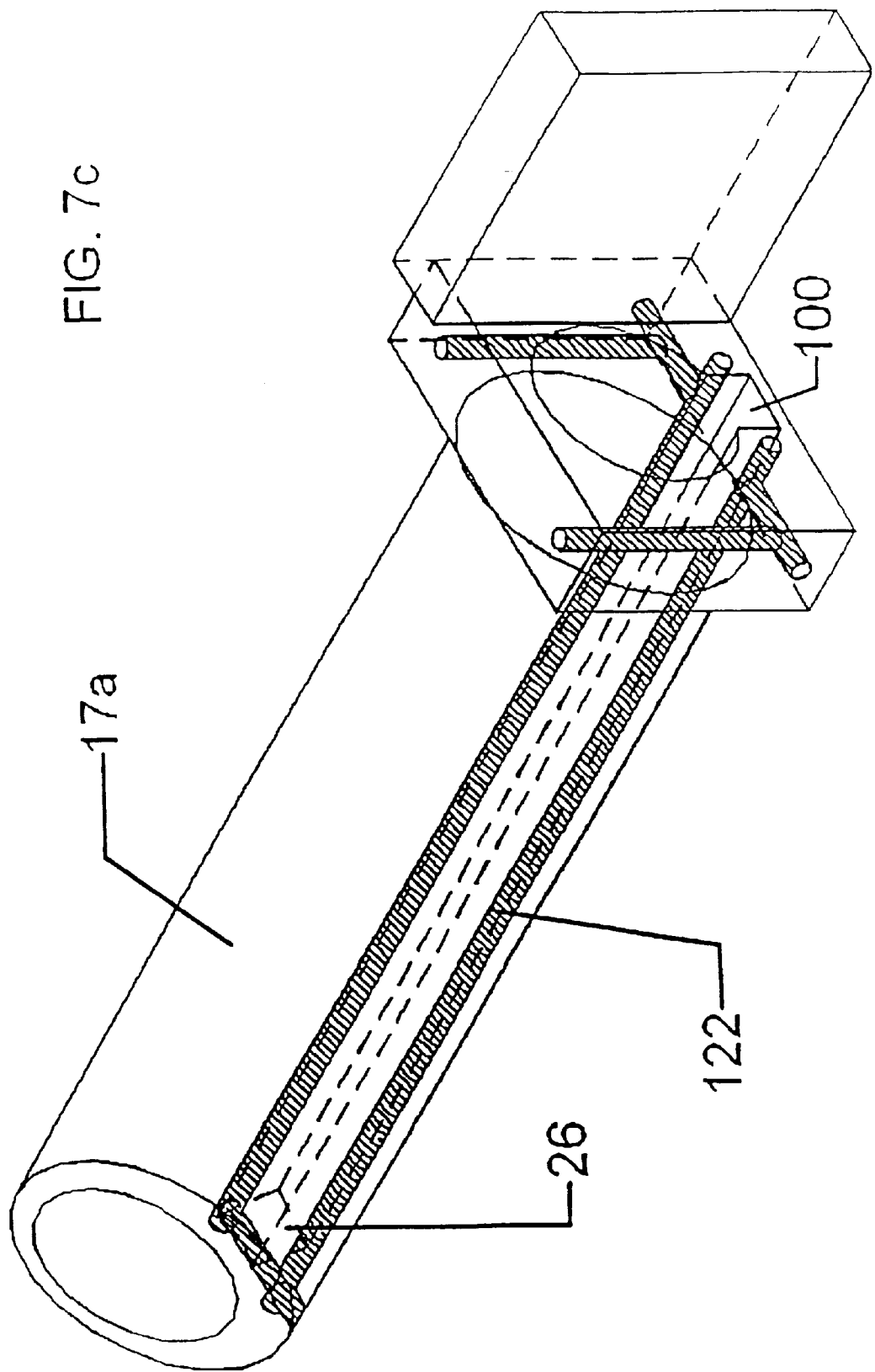

LASER SYSTEM FOR MARKING OR PERFORATING

DESCRIPTION

The invention is applicable to every laser marking or piercing system, such as lines for dynamic marking with which characters, bar codes, logos, etc. are marked in products.

STATE OF THE ART

The use of laser marking systems is known to print characters, logos, bar codes, etc. in products which are carried on a production line, for which the headstock includes an acoustical-optical deflector on which the laser beams is incident to which a radiofrequency signal is applied which produces a laser beam deflection according to different angles whoses value depends on the frequency applied, i.e., with different frequencies different deflection angles are obtained.

There exists a kind of headstock which fastens the laser tube by means of a set of strips provided with "fly wing-like" or other mechanisms allowing that the headstock moves according to XY axis to focus the laser beam on the acoustical-optical deflector inlet window.

The acoustical-optical deflector is fitted on a metallic part which contacts a wheel tilting about its central shaft and which is located at the external part of the headstock, so that it allows to change the deflector angular position with respect to the laser beam, allowing the deflector to be positioned in Bragg condition (an about 2.2° angle which must be formed between the incident beam and the deflector in order that this later may operate as such). When the deflector is in Bragg condition, by applying it the radiofrequency signal, it is capable of deflecting as an inciding beam at the different angles which makes possible to obtain the different marking points with maximum power. The adjustment is achieved via a micrometric passage screw together with an opposition spring, fastening being carried out through above mentioned metallic part.

To prevent the non deflected beam to go out, at the front part of the headstock and directly in contact with it, an element of adjustable position is located which prevents the non deflected laser beam goes out, being said element known as blocking element; an element which becomes hot because of the different incidence of the laser beam on the surface, being provided with an inlet and an outlet of a fluid which provides its cooling. This element movement adjustment is achieved thanks to a screw which can slide in an associated hole.

A fixed optical system concreted in a lens is provided between the deflector and the blocking element, the function of said lens being to focus the different laser beams on the surface to be marked, increasing this way the energetic density of the marking points.

The fixed optical system which is provided with a headstock does not allow the lens to move with the aim of optimizing the focal point. For such aim, all the system is to be moved, which means a not very accurate adjustment of the focal distance and hard to perform because of the system weight.

In a production line, where applications may be very different, there is usually varying sizes of the products to be marked, therefore the availability of adjusting the focal lens position is required to keep the focal distance with respect to the surface to be marked or changing very often the lens, a fact that with the conventional headstocks is very spectacular and little accurate.

On the other hand, the position of the element which blocks the non deflected beam exit, which is not in direct contact with the headstock, is dilated because it is heated by the laser action, a fact which makes rise to a significant reduction of movement flexibility. In addition, as this element is located after the lens, it is exposed to a more energetic density radiation provoking said element speedier impairment.

It must also be stated that Bragg's angle adjustment system shows problems because the tilting wheel and the part where the deflector is fitted are in contact through a cylindric shaft which allows the movement between these two parts and the headstock wall, which causes a difficulty to a perfect blocking which may give rise to the deflector misadjustment.

In addition, the opening of the headstock protecting cover is two large, facilitating thus that dust and dirtiness enter which damage namely the headstock optical system.

Last, the non direct access to the focal lens means another drawback in said headstocks.

On the other hand, there exists lasers whose beam has an elliptic shape at its outlet and, in addition, a very little diameter, i.e., for example at X axis it has an approximate diameter of "a" mm while at Y axis it is "b" mm, which means following focussing drawbacks:

1.—Because of the difference of diameters an astigmatism occurs at focussing, i.e., the distance between the lens and the maximum focal point (smaller point diameter) is different for both eyes. Therefore, a point where focussing is optimum cannot be achieved.

2.—The focal point shows an elliptic shape as it is generated from an elliptic beam, a fact which is not acceptable for marking applications where the directives on marking quality demand a maximum roundness of the points forming the characters.

3.—The focal point diameter is excessively large, because as it is known, the focal point diameter is inversely proportional to the diameter of the laser beam inciding on the lens, achieving, therefore, a low density energy.

To overcome these problems, conventionally an anamorphic beam expander is used consisting in an optical assembly which has different responses at the two axis, so that it provides each of the axis with a gain having a value equal to the ratio between the diameter of the opposed axis and the corresponding one achieving so a circular beam.

This system has the drawbacks that an arbitrary beam diameter cannot be obtained and in addition it has a high cost.

In addition, there exists no headstock which is directly attached to the laser tube without using strips having "fly wing-like" mechanizations.

OBJECT OF THE INVENTION

The invention has the object to provide a marking or piercing system offering a best safety and accuracy of the optical system and of deflection and also an easier adjustment of the focal distance with respect to the surface to be marked or pierced.

This object is achieved by means of a system as defined in the claims.

The invention has a plurality of advantages.

In the system according to the invention, the laser tube itself is used as optical bench for supporting and fastening the optical elements (beam correcting lens, acoustical-optical deflector, focal lens, etc.) used. These elements are located integral with the tube itself preventing the use of any adjustable element. This way a best safety is provided to the system as any future misadjustment is eliminated by releasing the adjustment element itself.

The system according to the invention includes a headstock with a focal lens which is located in a moving tube of a telescopic tube so that it can vary its position to set the focal set with respect to the surface to be marked therefore changing the position of the whole system is not necessary to set the focal distance. This headstock provides the focal distance adjustment so that the focal point is optimized on the surface to be marked or pierced.

The system according to the invention incorporates a system for absorbing a non deflected laser beam which is fully integrated in a fixed tube of the telescopic tube. Namely, the absorption system comprises a groove extending along the fixed tube of the telescopic tube, before the focal lens. The fixed tube has ducts channeling a cooling liquid. This configuration has the advantage of its small size because it adds but little volume to the telescopic tube.

The headstock moving tube is provided with a chamber having a first opening for applying a pressurized gas and a second opening for the exit of the gas and the laser beams, with which a positive gas flow is achieved preventing the entrance of particles to the system.

In addition, the adjustable position element blocking the non deflected beam outlet is located between the deflector and the focal lens the useful life of the element being extended as the beam inciding on it is not in focussing process.

In the event that the section of the laser beam is elliptic, as it has different diameters in both directions and, in addition, the beam diameter in too small, means are provided which condition that the laser beam section is the optimum, usually circular, for its further deflection by means of the acoustical-optical deflector. These means base their operation in the fact that between the beam diameter and the divergence a reserved ratio is established, i.e., a large divergence corresponds to a small diameter and vice verse, therefore it is possible to find a P point in the path travelled by the laser beams where following ratio occurs:

$$dhx+path \times divx=dhy+path \times divy.$$

wherein path is the distance between the laser beam outlet window and P point involved, dhx is the beam diameter at X axis, divx is the divergence at X axis, dhy is the beam diameter at Y axis and divy is the divergence at Y axis.

Therefore, if an element capable to perpetuate said shape is located at said point a perfectly circular beam is achieved. According to the invention this element is a cylindric lens.

To overcome the problem of the beam little diameter, there is available a conventional beam expander which increases the laser beam diameter up to a maximum tolerated by the acoustical-optical deflector and so obtains a focal point having a minimum diameter, and therefore, a maximization of the energy density at the marking point.

It must be pointed out that the invention allows, same as for conventional headstocks, to fit the headstock on the laser tube by means of there strips having "fly wing-like" mechanizations; or on the contrary, to fit it in a new way, directly on the laser tube. This new fastening is possible in those cases where there is an absolute control on the laser beam position and exit angle at the outlet of the laser tube with respect to the deflector window.

In the event that the headstock is fitted on the laser tube by means of stripe provided with "fly wing-like" mechanizations, the tilting means allowing to correct Bragg's angle are constituted by a tilting wheel assisted by a micrometric through screw and an opposition spring. The tilting wheel is provided with a central shaft which is located within the headstock by means of a socket engaged in one of the side walls in which, in addition, two associated holes through which two associated fastening screws pass which screw the wheel on which in turn the deflector is fastened allowing the deflector tilt and later fastening. This configuration prevents further misadjustments when handling the headstock.

Also in the event that the attachment of the laser on the headstock is achieved by means of the set of strips allowing the movement of the headstock according to XY axis, the element of adjustable position blocking the non deflected beam, is mounted on the headstock by means of an intermediate part which has available a support located on the top where a drive screw has been provided which linearly allows to vary its position. In addition, intermediate part heating is lower, dilations being reduced which allow a higher accurateness in the blocking adjustment process.

The locking element has dovetail wings which are located at the bevel-edged opening of the headstock its travel being guided.

On its side, in the event that the headstock is fitted fixed on the laser tube, the element blocking the non deflected beam outlet is fully integrated within the fixed part of the telescopic tube (the part forming part of the headstock); namely, the absorption (or blocking) system comprises a groove which extends along the telescopic tube fixed tube, before the focal lens. The fixed tube has ducts channeling a cooling liquid. This configuration has the advantage of its very small size, because it adds but little volume to the telescopic tube.

As the blocking element is located at a fixed position, on the headstock there is included one or several rotary orientable mirrors which are positioned so that the non deflected laser beam directly includes on the blocking element.

The system allows to mount the headstock in two possible orientations, a first one to mark in the laser tube same direction, and a second one allowing to mark at 90° from the laser tube.

In the event that the laser is fastened fixed on the headstock, the tilting means on which the deflector is fixed are determined by a strip on which the deflector is fitted and on which a rotation axis is included which is engaged in a hole specially arranged in the laser tube itself, allowing thus the rotation of the assembly formed of the deflector and the strip with respect to the laser tube. The strip supporting the deflector is provided, close to its vortex with associated holes through which associated screws are engaged which are screwed in the laser tube itself, so that said strip rotation is limited. To achieve the rotation of the strip supporting the deflector, the former is provided with a hole in which an eccentric tool is engaged the driving of which sets the deflector positioning to achieve Bragg's angle. The rated position of said strip is coincident with Bragg's angle, making thus the adjustment of this later easier.

In both cases of fastening the laser on the headstock (through movable strips at XY axis or directly), the telescopic tube is determined by a fixed tube and another movable the former counting on a lengthwise channel in which is located a screw which crosses the movable tube so that the travel is perfectly guided.

At the outlet of the movable telescopic tube a cover with a groove has been provided which allows the deflected beams exits, and which forms a recess with the lens where the fresh air and/or pressurized gas is injected, so that the entrance of dust and dirtiness is reduced at the headstock providing a best protection to the deflector and the focal lens.

Thereafter, for a best understanding of this specification and forming an integral part thereof, a series of figures is attached in which, with illustrative non limitative purpose the object of the invention has been illustrated.

DESCRIPTION OF EMBODIMENTS OF THE INVENTION

There is below a description of the invention based on above mentioned figures.

Figure 1:
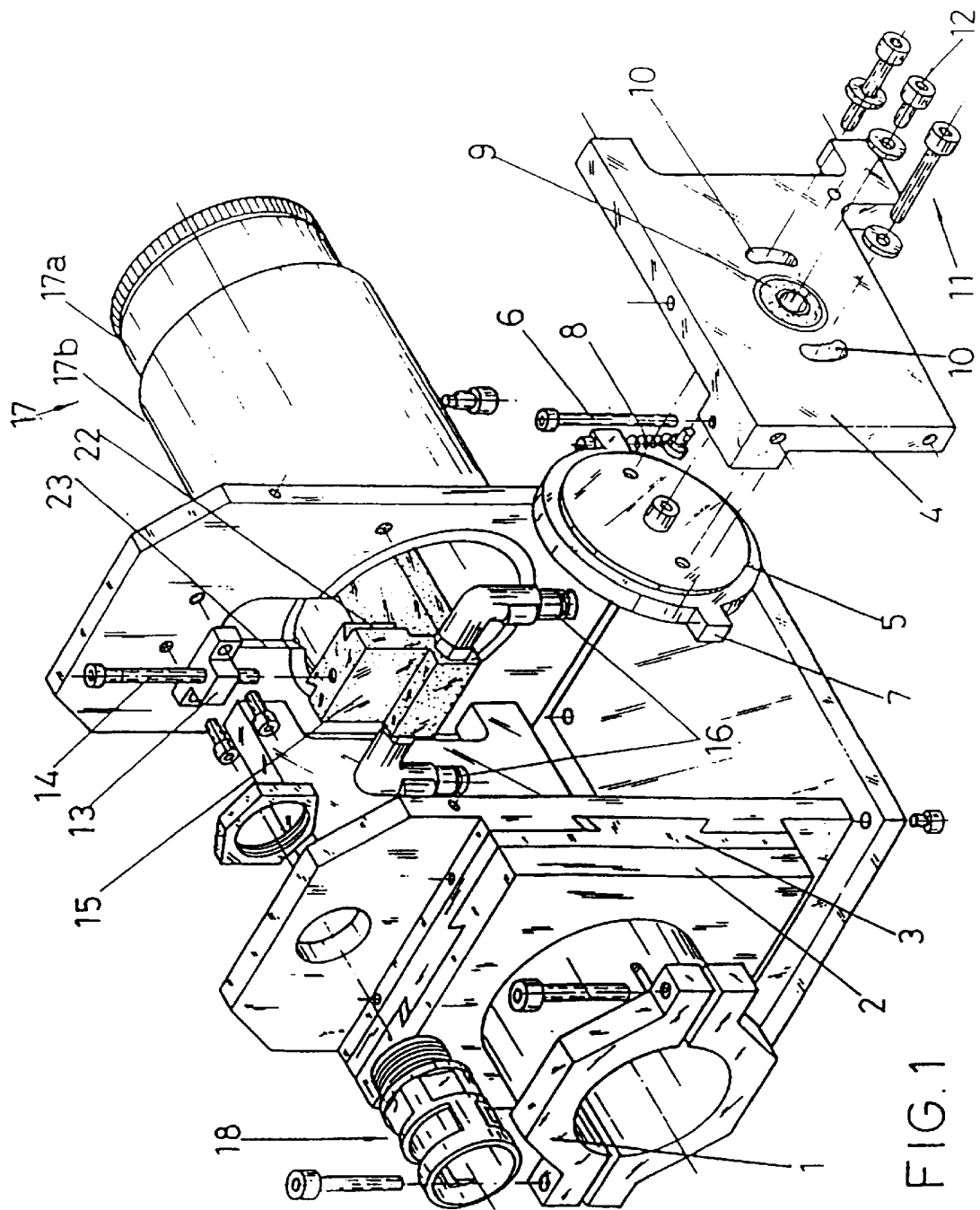
FIG. 1.—It shows an exploded perspective view of a first example of embodiment of a headstock which is attached to the laser by means of strips which allow the headstock movement according to X and Y axis. In this figure the deflector was not included in order to facilitate a best understanding thereof.
Figure 2:
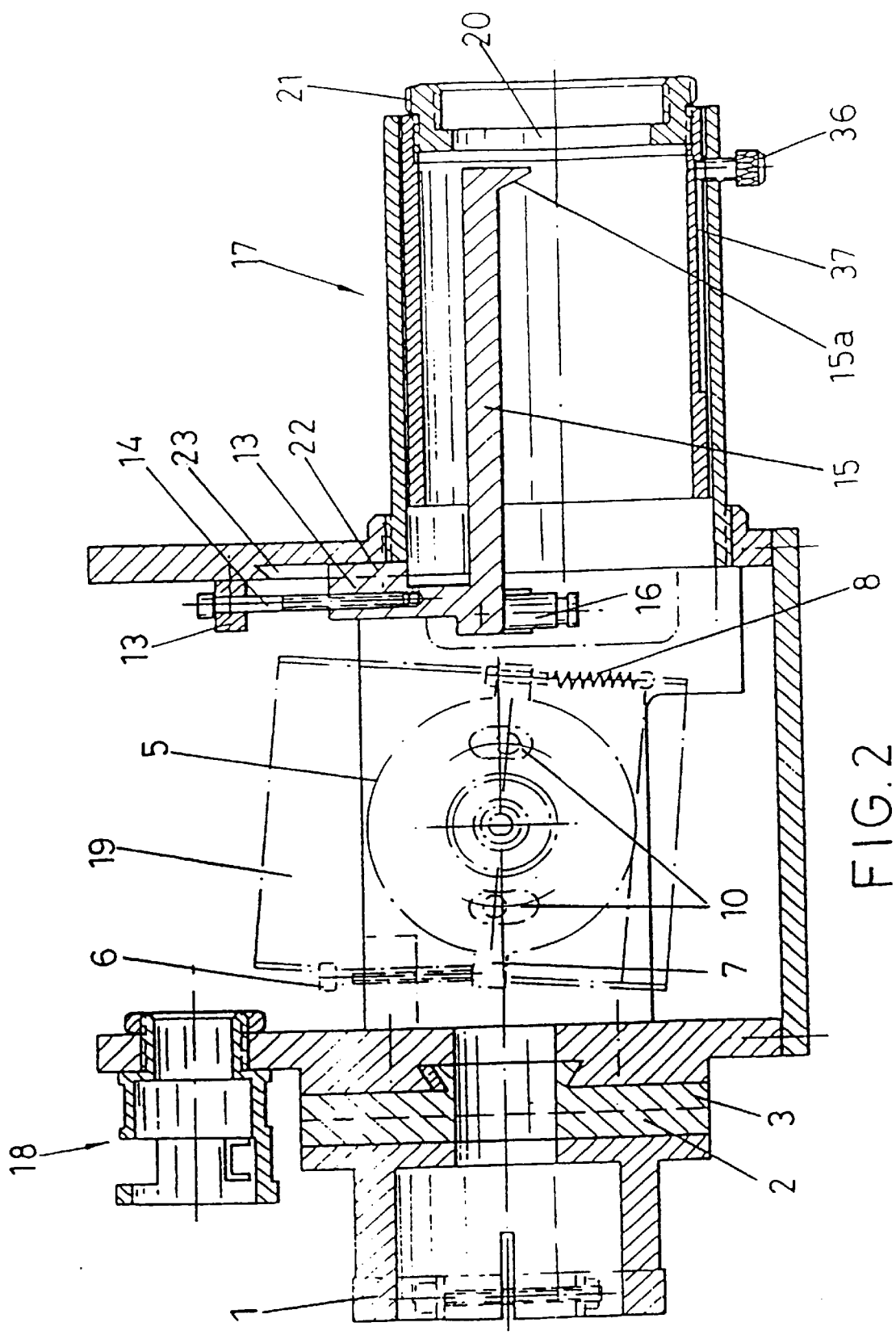
FIG. 2.—It shows a lengthwise section of the headstock of preceding figure with the elements mounted. In this figure the deflector and the means to which it is attached are illustrated with a spotted line these means allowing its tilting to adjust Bragg's angle.

First, and with the assistance of FIGS. 1 and 2, a first example of embodiment of the invention is disclosed, in which the headstock is attached to the laser tube with possibility of moving along X and Y axes, for which the headstock includes two strips 2 and 3 which are provided with "fly wing-like" mechanizations, so that the strip 2 can be moved in vertical sense (Y axis) and the strip 3 in horizontal sense (X axis). The laser tube is attached by means of a clamp 1 with which by moving the strips 2 and 3 it is allowed to focus the laser beam in the opening of a deflector 19 inlet (FIG. 2).

The deflector 19 remains located within the headstock and is directly fitted on a tilting wheel 5 the central axis of which is located in a socket 9 provided in one of the headstock side walls.

Sideways to the socket 9 on the side wall two associated holes 10 have been provided located diametrically opposite in correspondence with which on the wheel 5 threaded holes have been provided in which screws 11 are screwed. A screw 12 constitutes the fastening means of the wheel 5 shaft.

At the top of the side wall a screw 6 of micrometric passage is supported on the extension 7 of the wheel 5.

Opposite to the screw 6 there exists a spring 8 which operates under traction keeping the protrusion 7 in contact against the end of the screw 6.

On the grounds of above disclosed, it is easy to understand that by loosening screws 11 and acting on screw 6, a tilting of the deflector 19 is allowed, so that it is possible to adjust the deflector 19 rotation rotating an angle to achieve the system utmost operation, i.e. obtained marking points with maximum outlet power, which is known as Bragg's angle adjustment.

Once Bragg's angle is obtained, screws 11 are locked, the deflector 19 position is set with the accurate angle preventing thus possible misadjustment when handling the headstock.

At the headstock front part, a telescopic tube 17 has been provided which is determined by a fixed tube 17a and by a moving tube 17b in which a focal lens 20 (FIG. 2) is included, so that varying the moving tube 17b position with respect to the fixed tube 17a, it is possible to adjust the focal distance with respect to the surface to be marked.

In the moving tube 17b a lengthwise channel 37 (FIG. 2) has been provided, while the fixed tube 17a is crossed by a screw located in correspondence with the lengthwise channel 37, so that said screw remains located in the lengthwise channel 37, to achieve the perfect guiding of the telescopic tube travel, as well as to set the position by screwing said screw once it has been positioned.

The focal lens 20 is fixed to the end of the moving tube 17b through a threaded part 21.

Between the deflector 19 and the telescopic tube 17 a support 13 is included which is crossed by a screw 14 which fastens a part 15 the end of which 15a constitutes the non deflected laser beam blocking element.

This element is important as it is necessary to prevent the non deflected laser beam to exit, if not a continuous line would be marked on the surface to be marked located above or under the marked text.

The part 15 forming part of the blocking element 15a is provided with dovetail wings 22 which are located at an outlet having a bevel-edged opening 23 provided in the headstock so that the blocking part 15, 15a can be set at its upright position according to a linear travel adjusted by driving a screw 14.

This way the blocking element positioning at a given place is allowed to meet its functions (to prevent the non deflected laser beam passage).

It must be pointed out that the locking element 15, 15a, has available a fluid 16 inlet and outlet for its cooling because said blocking element is heated when the laser beam is inciding on it, a heating which is not directly transmitted to the headstock as it is linked to it through the support 13.

A part 18 constitutes an introducing, retaining and guiding element of the connection cables to the deflector.

The second example of embodiment relates to the event when an absolute control on the position and the exit angle of the laser beam is available, at the laser tube outlet, with respect to an inlet window of the deflector in which case the headstock is directly fitted on the laser tube, without interposing the strips 2 and 3 (FIGS. 1 and 2), in order that the fixed part of the headstock telescopic tube has a strip 24 to be directly fitted on the laser tube.

Fitting the deflector fastening strip to the laser tube is carried out by engaging the shaft 109 (FIG. 9) in a hole specially bored in the laser tube allowing thus said strip rotation; the hole 114 (FIG. 9) of the strip makes possible to apply an eccentric tool 124, (FIG. 9) the movement of which generates the wished deflector (19) support strip (110) rotation; said strip has the associated holes 1131, 1132 and 1133 which limit said strip rotation and their rated position being coincident with the position of Bragg's angle; and there exists the screws 1231, 1232 and 1233 allowing the further strip locking once this later has been positioned at the correct angle.

In this second example of embodiment (FIG. 3) the headstock is also provided with a blocking element 26 which prevents the non deflected beam from going outside, said beam is located on the headstock through a window 25 beam pierced thereon on which it is located by interposing springs 28 and screws 27 so that positioning gaging thereof may be carried out in order it meets its function of preventing non deflected beams from going out.

The telescopic tube 17' just as in first example is constituted by a fixed tube 17a' and a moving tube 17'b, but with the difference that in this case tube 17'b has available an opening 32 located in correspondence with the locking element 26, which remains located at said opening when carrying out fixed tube 17'b sliding.

The focal lens is located in a threaded part 35 which is provided with a step 39 on which the focal lens stops, remaining fixed through a socket 34.

The front part of the moving tube 17'b is obturated by a cover 33 provided with a groove through which the deflected beam is allowed to exit, forming a recess with the lens to which fresh air or pressurized gas is injected, so that the focal lens remains protected preventing dust and dirtiness to deposit on it. This characteristic is also applicable to the first example of embodiment (FIGS. 1 and 2).

Also the fixed tube is provided with a lengthwise channel 38 in which a screw 36 is housed to allow fixed tube 17'b correct guiding, positioning and fastening.

Figure 3:
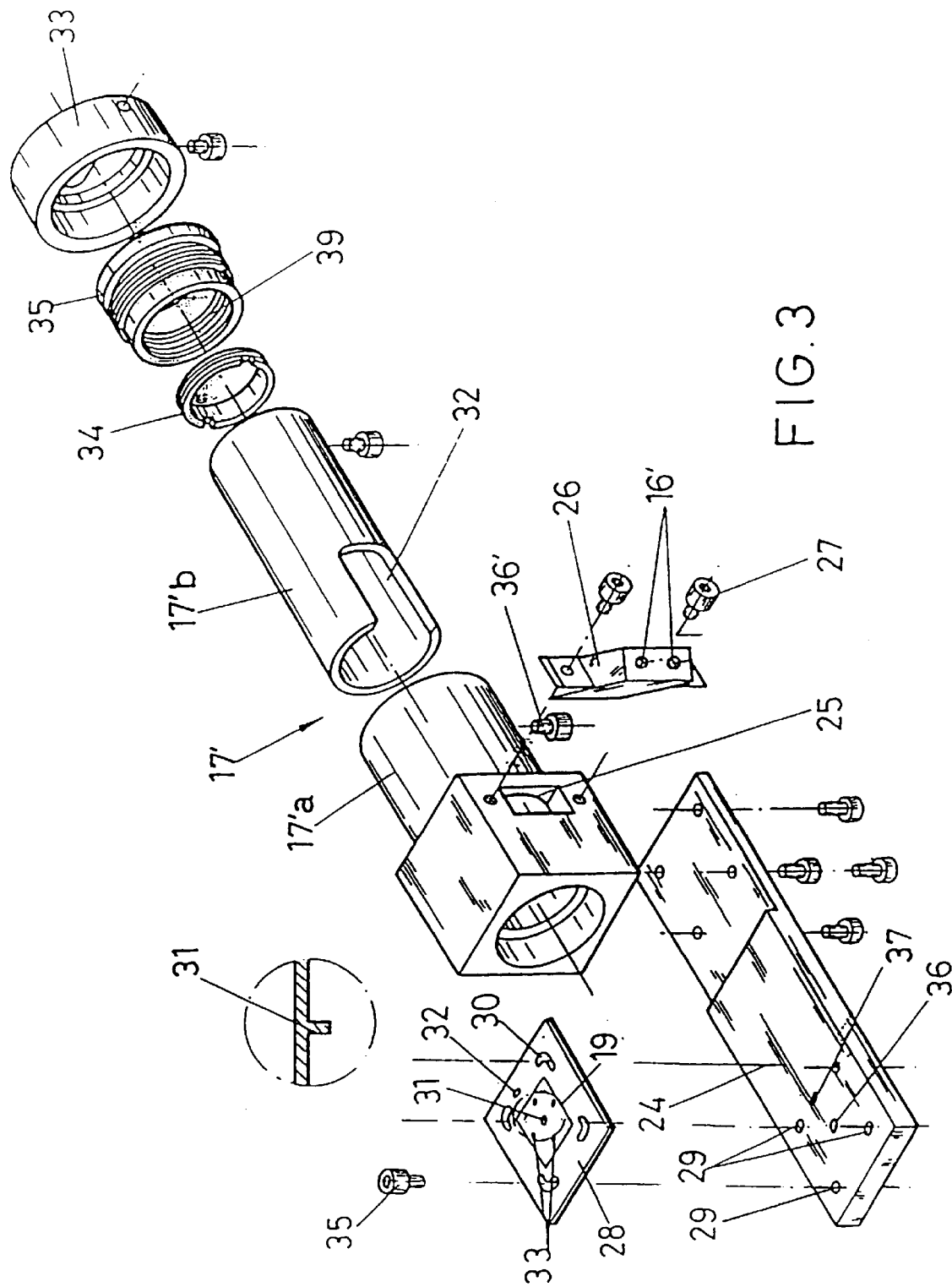
FIG. 3.—It shows an exploded perspective view of a second example of embodiment of the invention in which the headstock is directly fitted fixed to the laser tube. In this figure the deflector was schematically illustrated.
Figure 4:
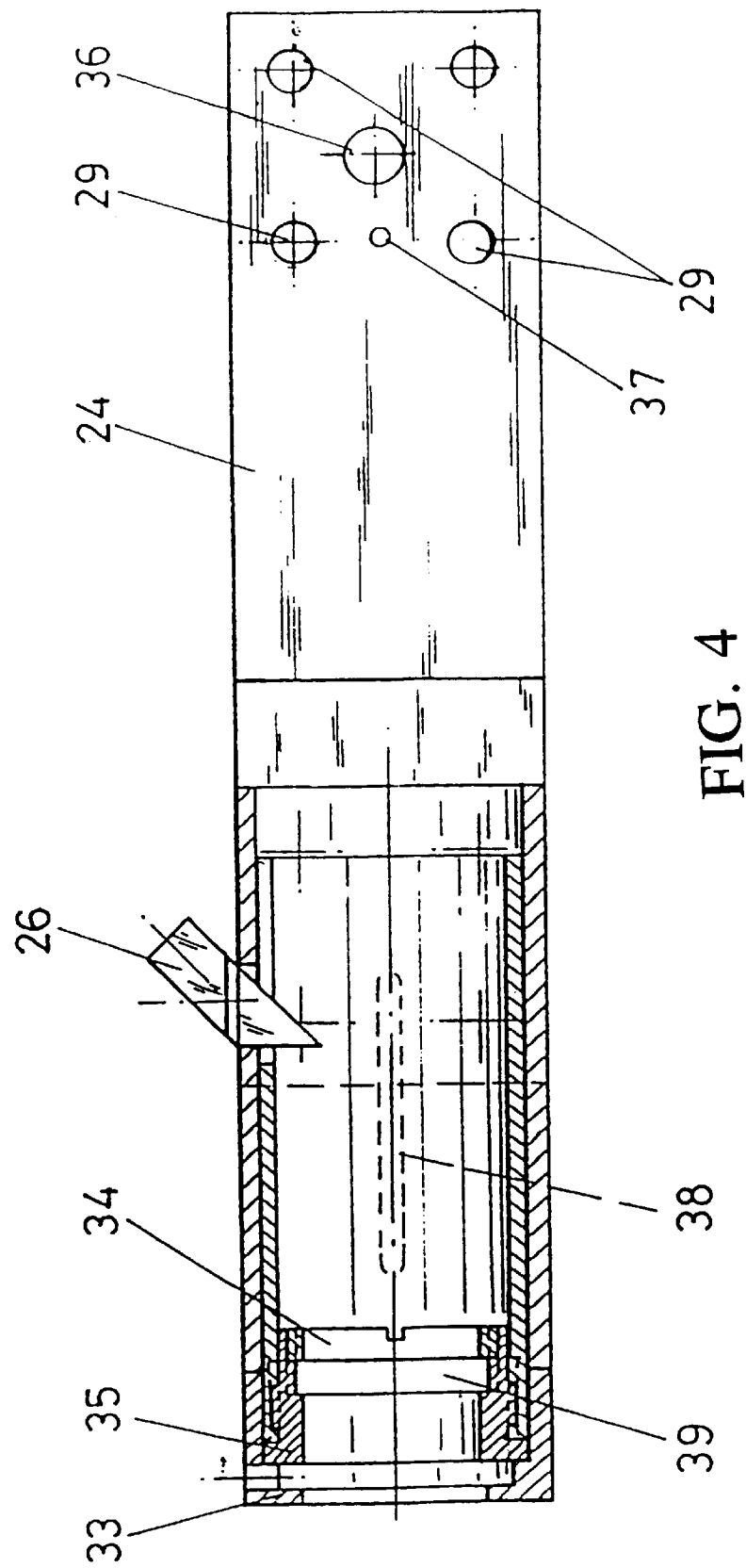
FIG. 4.—It shows a view according to a lengthwise section of the headstock of the preceding figure, in which the strip of attachment to the deflector has been suppressed.
Figure 5:
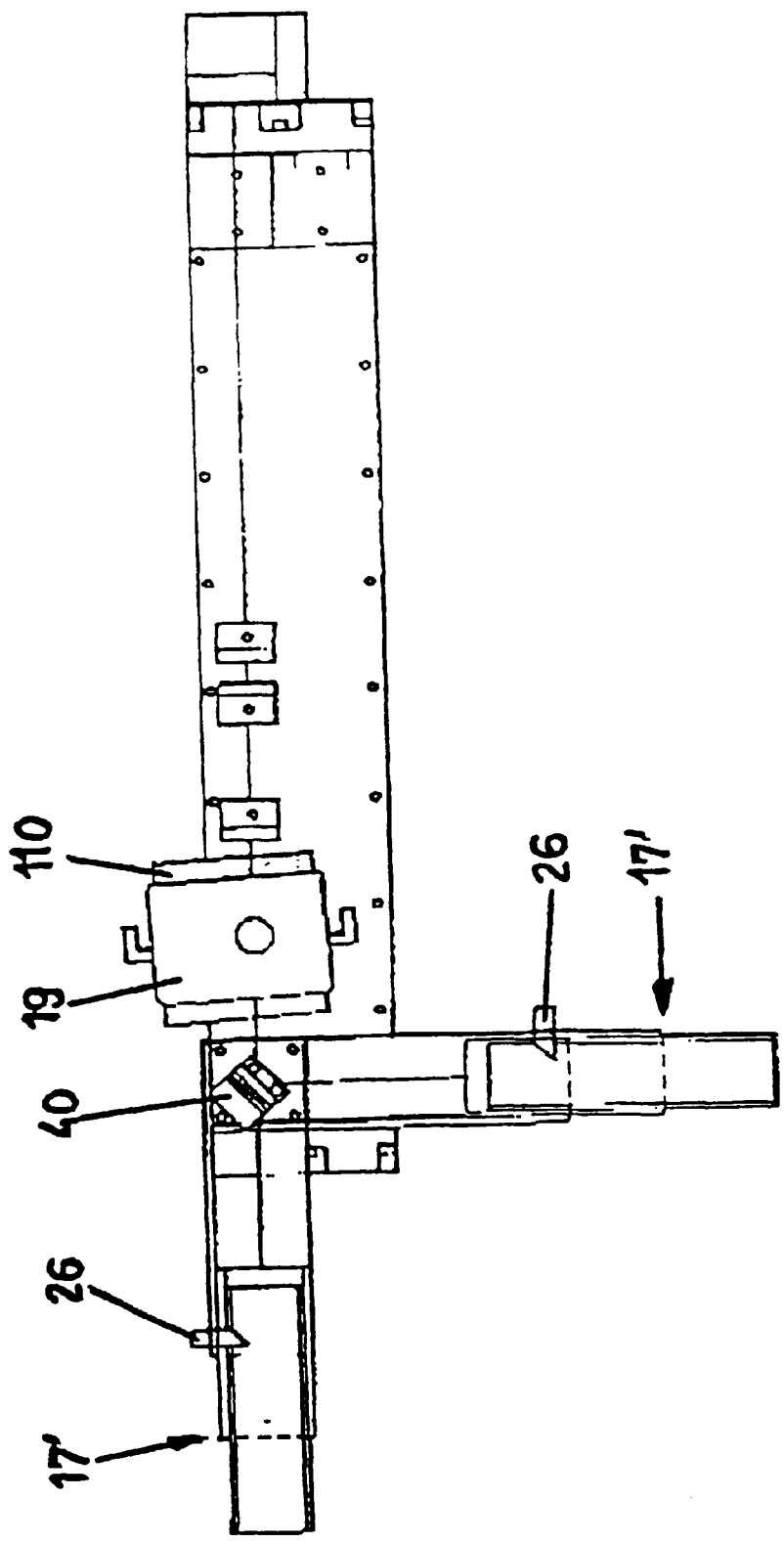
FIG. 5.—It shows a schematical view of a possible application of the headstock of FIGS. 3 and 4 in which a mirror has been provided hinged at an adjustable position to shift 90 degrees the different laser beams and to orientate the non deflected beam on the blocking element and to allow the location of a headstock in a position perpendicular to the laser direction, and another in the same direction than the laser, by suppressing said hinged mirror.

In addition, the headstock of FIGS. 3 and 4 accounts on a moving mirror 40 (FIG. 5) which is provided with a vertical and an horizontal direction movement so that the laser beam is adjusted in order that the non deflected beam incides on blocking element 26. In addition, the use of mirror 40 allows to locate a headstock forming about 90° with respect to the laser.

For correcting positioning the non deflected beam on the locking element 26 in the event of marking in straight line (marking direction in line with the laser) associated holes (30) are pierced in the fastening strip 24 (FIG. 4) of the telescopic tube which allow the angular adjustment thereof.

In fact the angular difference between the telescopic tubes to each other is 85.6°, which is the difference between deflected angles.

In FIG. 4 a laser tube has been illustrated with two possible orientations of the telescopic tube, which will allow the use of the headstock in any of the two positions according to the needs of the production line where it is wished to mark or pierce.

According to the already commented at the point "State of the Art", there exists lasers in which the laser beam section is elliptic and small, which arises above disclosed focussing problems, therefore means are included to achieve a perfectly circular beam section, which are located before the deflector, which in the case of the headstocks of the invention are embodied by a cylindric lens which takes profit of the fact that the beam diameter and divergence are two intrinsic laser beam parameters because a reverse relation is established between them, i.e., to a small diameter beam corresponds a large divergence and vice versa, so that to achieve a circular section of the beam, the lens must be located at a point where are met:

$$dhx + path \times divx = dhy + path \times divy$$

wherein path is the distance between the laser beam outlet window and P point involved, dhx is the beam diameter at X axis, divx is the divergence at X axis, dhy is the beam diameter at Y axis and last, divy is the divergence at Y axis.

To overcome the problem of the beam small size, it is foreseen to have a beam expander available which increases the laser beam up to the maximum tolerated by deflector 19 and thus to obtain a focal point minimum diameter and, therefore, a maximization of the energetic density at the focal point.

Now with the assistance of FIGS. 6 to 9, a third example of embodiment of the invention is disclosed.

Figure 6A:
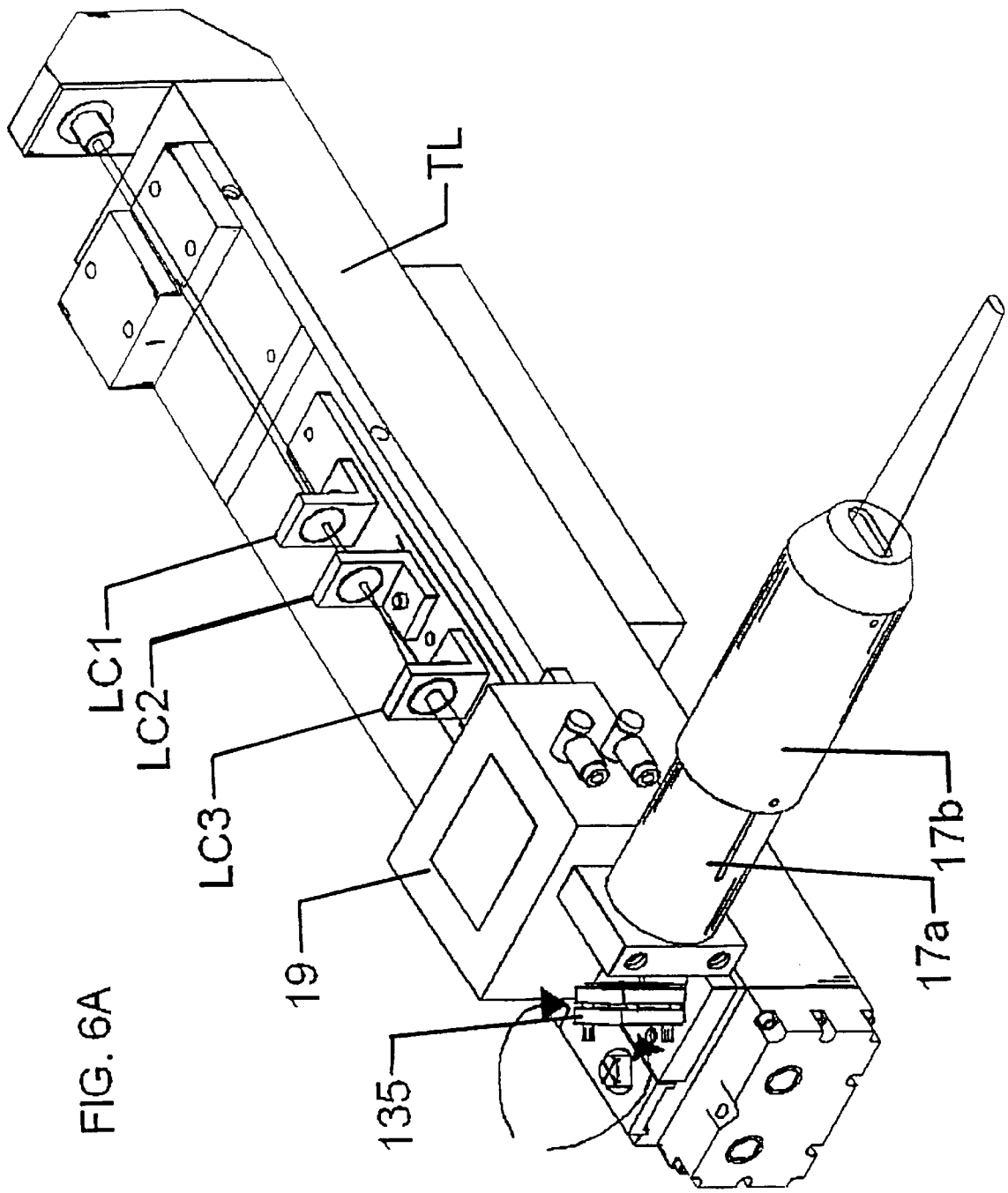
FIGS. 6 to 9. They show details of a third example of embodiment of the invention.
Figure 6B:
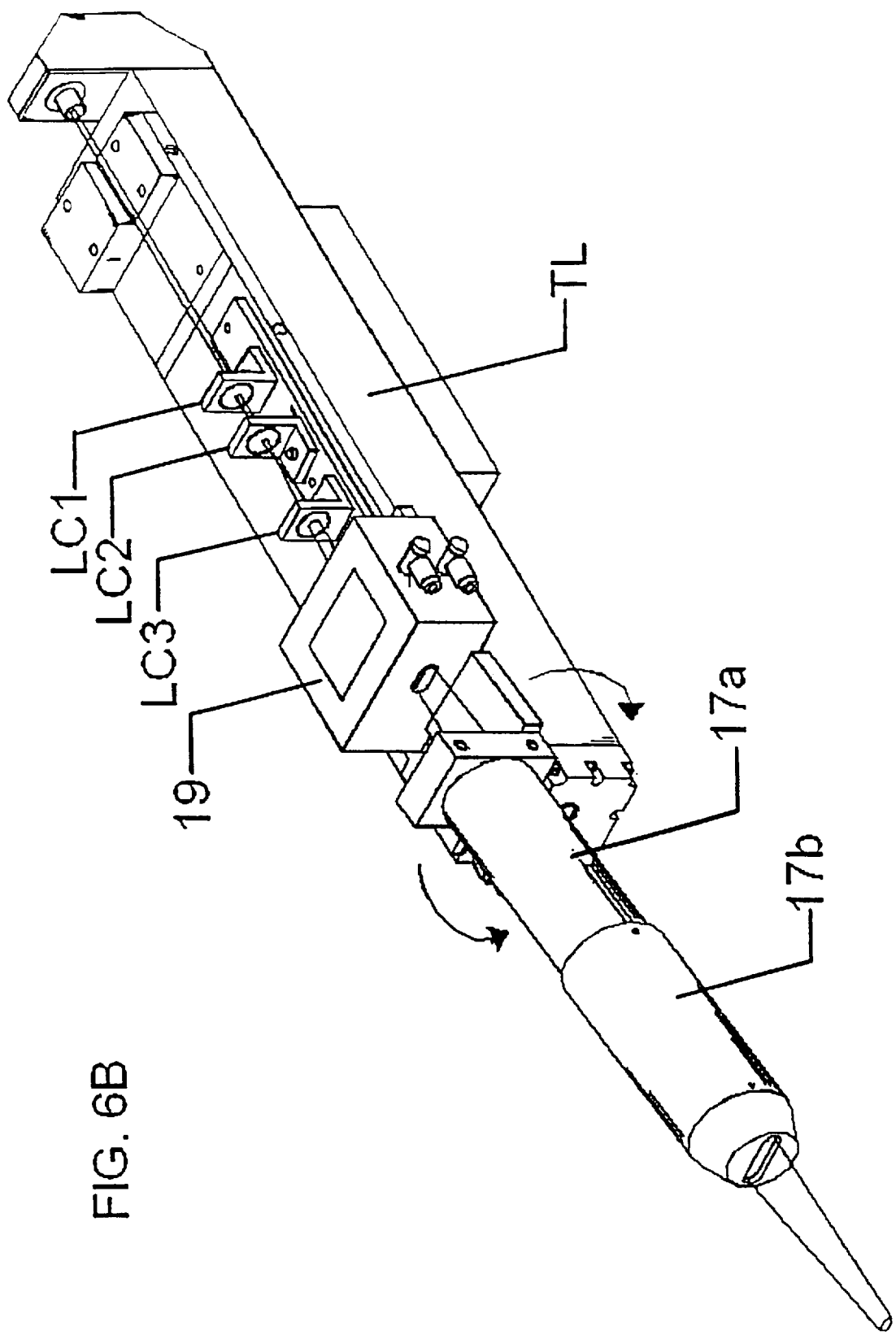

FIG. 6a shows the location of a C headstock in perpendicular position to the direction of a TL laser tube, while FIG. 6b shows the location of C headstock in same direction as TL laser tube.

On TL laser tube all the optical components of the system (LC beam correcting lens, deflector 19, rotation mirror 135 and telescopic tube 17) are tightly linked.

The laser beam, after going outside the laser tube is located at a first LC1 lens (a cylindric lens) which has the object to convert the laser beam section from elliptic to circular. Later on, it passes through a set of two LC2 and LC3 lens (a beam expander) the object of which is to enlarge the laser beam section to the maximum allowed by a deflector inlet window.

Figure 7A:
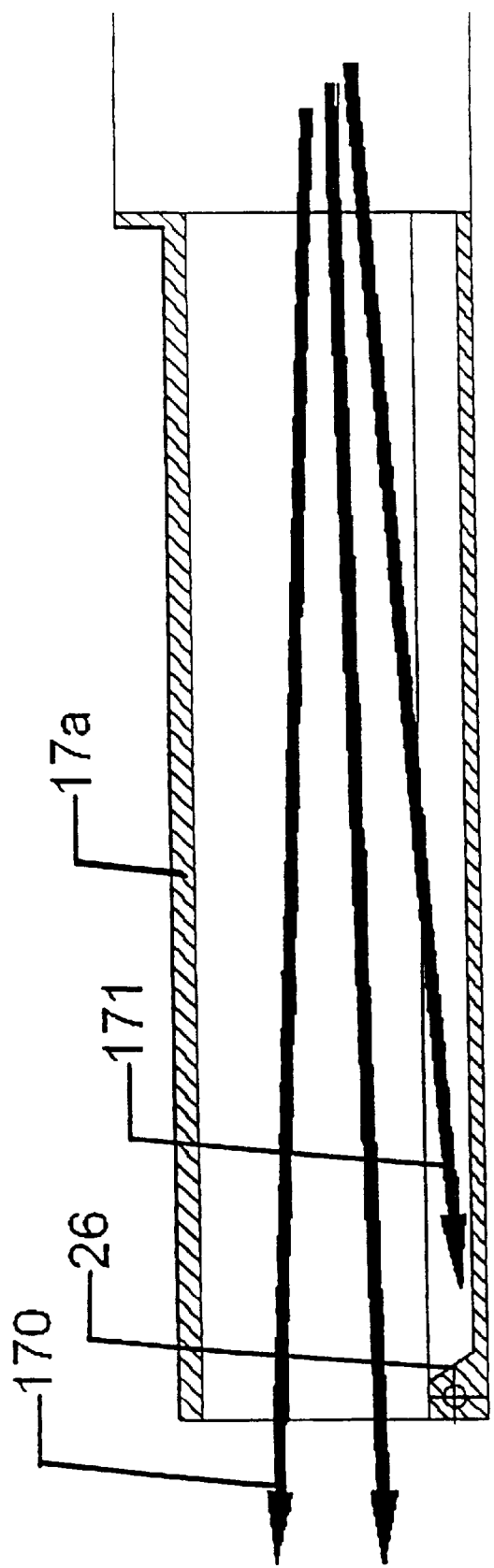

The laser beams generated by the deflector incide on the mirror 135, which has the mission to shift 90° its trajectory. This mirror is mounted on a support, which is mounted integral on TL laser tube, but which allows said mirror angular adjustment. This adjustment allows first to focus the deflected beams on the opening (118, FIG. 8) of the lens protecting element outlet and second, to adjust the non deflected beam trajectory in order it exactly incides on a blocking element 26 (FIG. 7a).

Fixed part 17'a of the telescopic tube is perfectly fastened on the laser tube without any tolerance.

FIG. 6b shows the telescopic tube fixed tube mounted in same direction of the laser beam (0°). An anchorage of this arrangement has available a certain tolerance (angular movement, i.e. rotation to the horizontal plane) allowing to slightly rotate (a few degrees) the fixed tube in order the non deflected beam exactly incides on the blocking element. In the configuration according to FIG. 6a this adjustment is carried out thanks to the movement available to the mirror holder.

A second option to carry out the adjustment of said non reflected beam on the blocking element is to use a set of two moving mirrors in opposition (not shown in FIG. 7).

FIG. 7a shows how the deflected beams (170) freely goes out because they perfectly goes through an opening 118, (FIG. 6) pierced on the lens protector 111, (FIG. 8), while the non deflected beam (171) directly incides on the blocking element, but in this case is an inclined wall located at the end of the groove (100, FIG. 7c), preventing thus its going out.

The non deflected beam cannot go out, as it does not participate in marking (it corresponds to none pint of the point die).

The non deflected beam is a limitation of the deflector itself, which is not capable to deflect the whole inciding energy, always leaving a percentage thereof without deflecting.

FIG. 7b illustrates the straight path travelled by the non deflected beam (171). Note successive reflections which occur within the fixed tube until said beam is definitely lost.

In the figure the angle which forms a blocking element with respect to the fixed tube (125°) as well as the angle it forms with respect to the non deflected beam (121°), generating so a series of successive reflections which make possible to fully eliminate the non deflected beam within the telescopic tube fixed tube. The blocking element cannot be perpendicular to the non deflected beam as it could generate reflections inwardly the laser tube.

In FIG. 7c, a perspective view is illustrated of the fixed tube 17'a of the telescopic tube, where one can see the groove or slot 100 through which the non deflected beam passes, the blocking element 26, which is an essentially vertical wall (it has an inclination comprised in the range from 115° to 130° with respect to the horizontal plane) where the non deflected beam incides as well as some conductors 122 located on the whole perimeter of the fixed tube through which conductors a cooling liquid circulates, which is charged of keeping the blocking element 26 thermically stabilized. The wall inclination of the locking element makes possible to eliminate the non deflected beam by means of successive reflections within the fixed tube. This configuration has the advantage of its small size.

The blocking element is not an exactly vertical wall, because it could generate reflections which would be on recess toward the laser tube itself, which could damage it. The inclination given to it so that in the event a reflection occurs it rebounds on the internal wall of the fixed tube been lost in this later. We note that the trajectory travelled through the non reflected beam (171) (FIG. 7b) inside the fixed tube.

Figure 8:
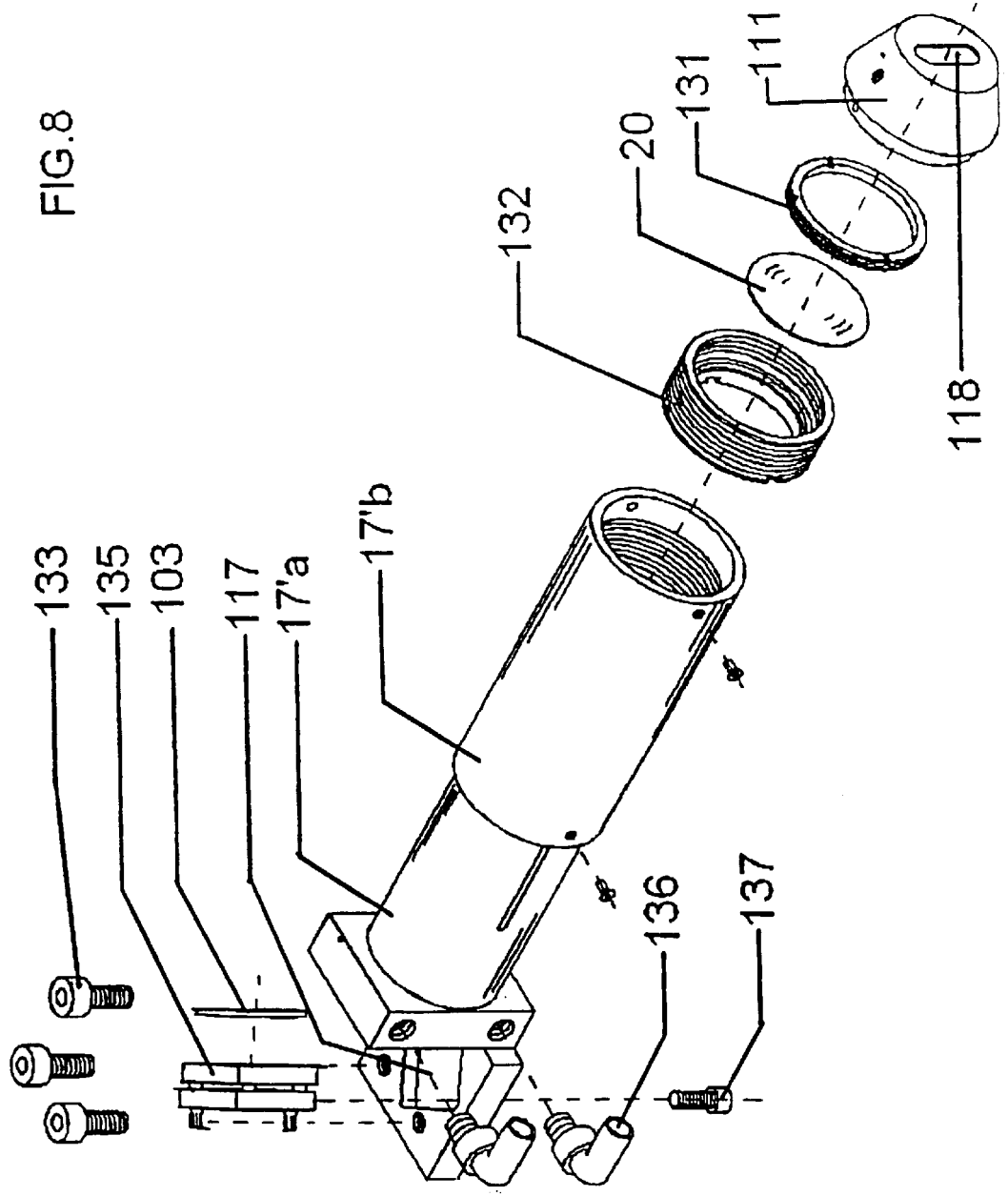

In FIG. 8 one can see the telescopic tube exploded view. The fixed part 17'a is fitted on the laser tube by means of screws 133, the moving part 17b slides on the fixed part its run being limited by a slide located on the side. The wall inclination makes possible to eliminate the non deflected beam by means of successive reflections within the fixed tube. At the end of the moving part there is a lens holder 132 which allows to fasten the lens 20 which remains locked by a nut 131. As protecting element for the lens a cap 111 is used which prevents that dirtiness deposits on the lens 20, a fact which is achieved through pressurizing the chamber created by it. Pressurized gas is applied which generates an outwardly positive circulation of the gas, namely fresh air.

The fixed part has available connectors 136 which allow the entrance of cooling liquid toward the cooling internal circuit.

The rotation mirror 103 to 90° is mounted on a lens holder 135 for which a housing 117 has been arranged which facilitates its support and further adjustment.

Figure 9:
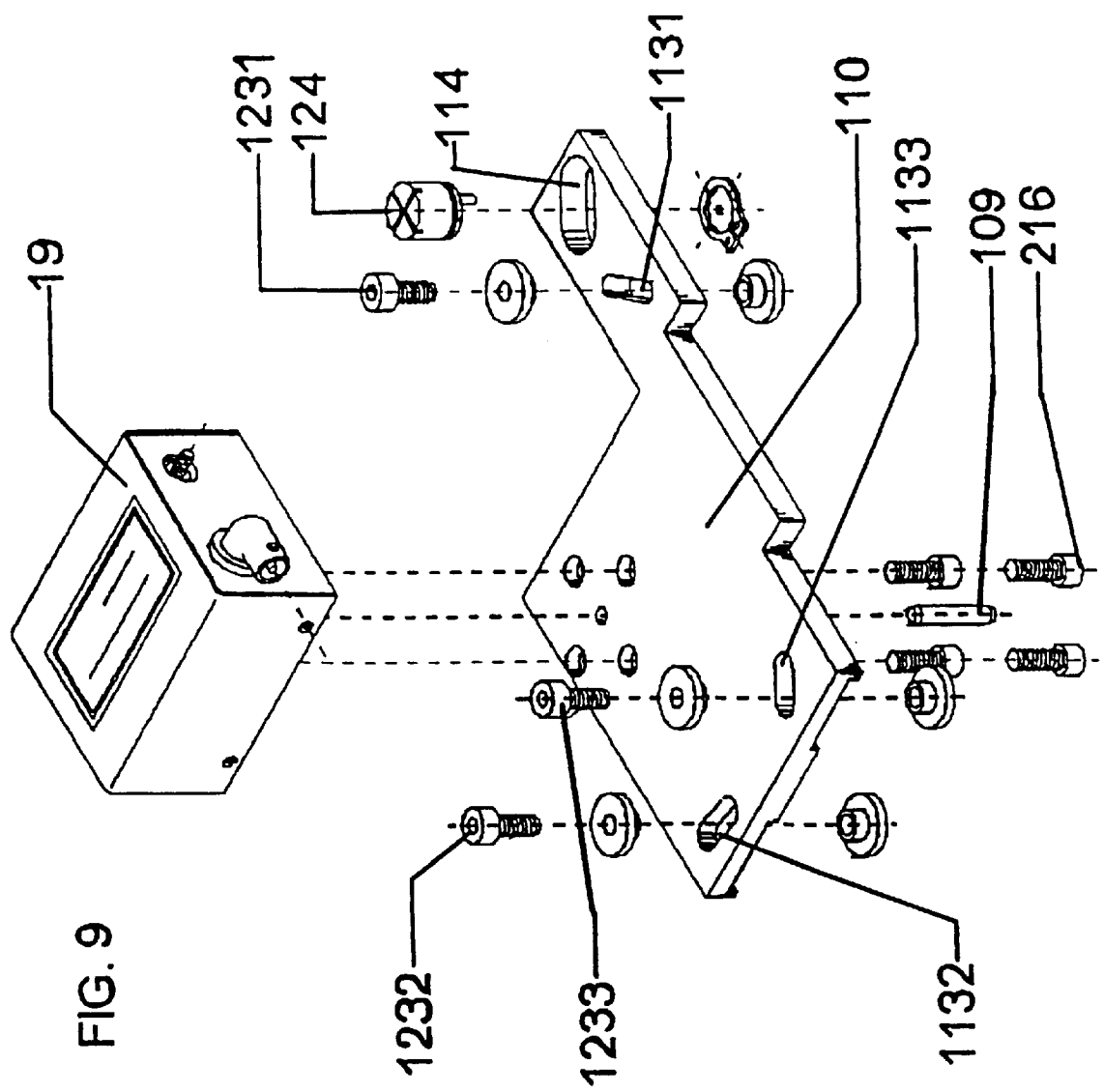

FIG. 9 shows the exploded view of the reflection system, composed of the deflector 19, a supporting plate or strip 110 and the adjustment and blocking elements.

The deflector 19 is tightly fitted on the supporting plate 110 by means of screens 216. The plate has available a rotation shaft 109 for which a housing has been arranged in the laser tube which allows that the assembly plate plus deflector rotate with respect to the laser tube.

Said rotation is achieved by driving an eccentric tool 124 in the hole 114 which provokes a rotation of the base plate 110 supporting the deflector 19. As blocking element, to be able to fasten the system once it has been adjusted to the deflector 19 at Brigg's angle (an angle necessary in order the deflector may deflect), three associated screws 1231, 1232, 1233 are arranged which passing through three holes 1131, 11,32, 1133 pierced in the supporting plate 110 allows this later is fastened on the laser tube.

The sets 1131, 1132, 1133 have been designed so that is the rated position the system is at Bragg's angle, a fact which facilitates the adjustment task.

As above described, the telescopic tube 17, a system of beam correcting lens system and a deflection system are located integral with TL laser tube.

The telescopic system supporting the lens allows the accurate positioning of said lens to a focal distance from the product to be marked or pierced as well as straight line marking or piercing (FIG. 6b) with laser or at 90° (FIG. 6a).

In order to direct the non deflected laser beam to the absorption system, two complementary solutions are envisaged depending on which is the system configuration (to 90° or 0°).

90°: a mirror 103 (FIG. 6a) located just after the acoustical-optical deflector has the double function of performing the 90° of the set of the beams (the non deflected beam and all the beams corresponding to the points to be marked) and to realize a fine adjustment for positioning the non deflected beam on the wall 26 (FIG. 7b) of the blocking element.

0°: an element for anchoring the telescope has available a suitable gap to allow a fine adjustment of the non deflected beam on the vertical wall 101 (FIG. 7b) of the absorber or a set of two opposite moving mirrors (not shown in the figure).

The rated position of the telescope fixed tube corresponds to the incidence of the non deflected beam on said absorbing surface.

The system disclosed of the deflector system adjusting blocking has a mechanical structure relatively simple. Blocking operation does not give rise to any rotation therefore possible misadjustments are prevented. The eccentric element allows an easy and reliable adjustment. In addition, the fact that the rated position of the strip 110 is coincident with Bragg's angle facilitates its search. Once adjusted and blocked, above disclosed system cannot be misadjusted.

What is claimed is:

1. A system for marking a perforation by laser comprising:
   a laser tube; and
   a headstock including an adjustable optical system therein, the optical system comprising at least one lens for focusing a laser beam emitted from the laser tube and a deflection system producing a deflected laser beam and a non-deflected laser beam;
   the headstock being solidly attached to and supported by the laser tube such that the laser tube operates as an optical bench for the optical system.

2. The system according to claim 1, wherein the mobile tube comprises a protection element forming a chamber with a first opening for receiving a pressurised gas and a second opening for discharging received gas.

3. The system according to claim 2, wherein the second opening is located in a trajectory of the deflected laser beam.

4. The system according to claim 1, wherein the optical system further comprises a telescoping portion having a fixed tube and a mobile tube, the focusing lens being located in the mobile tube;
   the system further comprising an absorption system for absorbing the nondeflected laser beam integrated entirely in the fixed tube.

5. The system according to claim 4, wherein the absorption system comprises a groove that extends substantially throughout the length of the fixed tube.

6. The system according to claim 4, wherein the absorption system comprises a blocking element located in the fixed tube.

7. The system according to claim 6, wherein the blocking element has a wall inclined relative to a longitudinal axis of the fixed tube.

8. The system according to claim 7, wherein the headstock further comprises an adjustable mirror positioned to reflect the non-deflected laser beam onto the blocking element.

9. The system according to claim 6, wherein the fixed tube has conduits therein suitable for carrying a coolant liquid.

10. The system according to claim 1, further comprising means for defining a circular cross-section laser beam from an elliptical cross-section beam, the means for defining a circular cross-section being between the laser tube and the deflection system.

11. The system according to claim 10, characterized in that the means for defining a circular cross-section is located at a point at which the diameter of the laser beam on the X axis plus the distance traveled between an exit window for the laser beam and this point multiplied by the divergence of the laser beam in said X axis will be equal to the diameter of the laser beam on the Y axis plus the distance traveled between an exit window for the laser beam and said point multiplied by the divergence in said Y axis.

12. The system according to claim 10, wherein the means for defining a circular cross-section is a cylindrical lens.

13. The system according to claim 12, wherein the means for defining a circular cross-section comprises a beam expander.

14. The system according to claim 13, further comprising a cylindrical lens, the expander being located immediately after the cylindrical lens.

15. The system according to claim 1, further comprising an adjustment and blocking system for the deflection system.

16. The system according to claim 15, wherein the adjustment and blocking system comprises a support element capable of a rotational movement that permits the adjustment of the direction of the non-blocked laser beam and its subsequent blocking.

17. The system according to claim 16, wherein the support element comprises a fine adjustment mechanism.

18. The system according to claim 15, wherein the adjustment and blocking system comprises a flat plate with three circular slots through which blocking elements operate.

19. The system according to claim 18, wherein a central position of the blocking elements relative to the circular slots corresponds to the Bragg angle.

20. The system according to claim 1, wherein the optical system further comprises a telescoping portion having a fixed tube and a mobile tube, the focusing lens being located in the mobile tube;

the fixed tube having fixing devices for connecting the laser tube and the fixed tube to each other in one of at least two angle positions.

21. The system according to claim 20, wherein the fixed tube part has a housing for supporting a mirror.

22. The system according to claim 20, wherein the fixing devices are adjustable in a horizontal plane to permit adjustment of alignment with respect to the laser tube.

23. The system according to claim 20, further comprising two opposing mobile mirrors for adjustment of the direction of the non-deflected laser beam.

24. A system for marking or perforation by laser comprising:

a laser tube; and a headstock including an adjustable optical system therein, the optical system having a telescoping portion having a fixed tube and a mobile tube and further comprising at least one lens for focusing a laser beam emitted from the laser tube, the focusing lens being located in the mobile tube;

the headstock being solidly attached to and supported by the laser tube such that the laser tube operates as an optical bench for the optical system.

25. The system according to claim 24, wherein the headstock is fixed to the laser tube by an adjustable positioning device.

26. The system according to claim 25, wherein the adjustable positioning device comprises flat plates with sliding dovetail interlocks.

27. The system according to claim 25, wherein the deflection system is positioned on a swivel mount assembly comprising a swivel-mounted wheel with micrometric angle adjustment and blocking devices, the swivel mount system permitting adjustment of the Bragg angle.

* * * * *